United States Patent [19]
Brown et al.

[11] Patent Number: 6,105,223
[45] Date of Patent: *Aug. 22, 2000

[54] SIMPLIFIED PROCESS FOR MAKING THICK FIBROUS STRUCTURES

[75] Inventors: Jerry Brown; Wade W. Fillmore, both of Pueblo West; Jay H. Killian, Jr., Canan City; Ronnie Sze-Heng Liew, Pueblo; Wayne Lundblad, Pueblo West; Edward Lee Morris, Jr., Pueblo, all of Colo.

[73] Assignee: The B. F. Goodrich Company, Charlotte, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/846,731

[22] Filed: Apr. 30, 1997

[51] Int. Cl.[7] ........................................... D04H 5/08
[52] U.S. Cl. .................................... 28/111; 28/107
[58] Field of Search .............................. 28/107, 108, 109, 28/110, 111, 103, 112, 113, 114, 115

[56] References Cited

U.S. PATENT DOCUMENTS

| | | |
|---|---|---|
| 1,452,704 | 4/1923 | Poulin et al. . |
| 2,339,431 | 1/1944 | Slayter ........................................ 28/79 |

(List continued on next page.)

FOREIGN PATENT DOCUMENTS

| | | |
|---|---|---|
| 528336A2 | 2/1993 | European Pat. Off. . |
| 530741A1 | 3/1993 | European Pat. Off. . |

(List continued on next page.)

OTHER PUBLICATIONS

Computer Assisted Quality Assurance On Needling Machiens, 2N s.a.s. di Antonia Nancini, 1–51100 Pistoia, Italy, Readers Service No. 2–143, INB Nonwovens 1+2/92, pg. 41.

Measurement of Needle Punch Density In Dynamic State And Application To Process Control, T. Yokota, H. Takahashi, N. Kawafune, pg. 599–603.

Engineering Needle Punched Nonwovens To Meet Functional Properties, A.K. Rakshit, A.N. Desai & N. Balasubramanian, pg. 20–24.

A Study On The Properties Of Needle–Punched Non–Woven Fabrics Using Factorial Design Technnique, V. Subramaniam, M. Madhusoothanan & C.R. Debnath, A.C. College, Madras, pg. 124–132.

Studies On The Needle Process: Influence of Stick Density And Needle Penetration On Quality–Related Properties And Needle–Punching Effectiveness, Dr. Rer. Nat. Gunther Voigtlander, Research Institute for Textile Engineering, Chemnitz GmbH, Meilliand Textilberichte, vol. 5, 1992, pp. 391–396. (Copy in German language, pg. 391–396, and translation to English language, pg. 1–32).

A Contribution To The Determination Of Felting Needle Puncture Depth, A Ptacek et al., Textilbetrieb, Jul./Aug. 1987, pg. 26–29, (Copy of German language, pg. 26–29, and English translation, pg. 1–17).

U.K., Request For A Grant Of A Patent, No. 8602003, Jan. 28, 1986, Title: "A Carbonisable Fibre Assembly", Inventor: Peter Geoffrey Lawton and Norman Smith.

*Primary Examiner*—Danny Worrell
*Attorney, Agent, or Firm*—Kevin L. Leffel; David M. Ronyak

[57] ABSTRACT

The invention relates to a process for making thick fibrous structures. More particularly, the invention relates to a simplified needle-felting process wherein loose fiber is accreted into a thick fibrous structure by repeatedly driving a multitude of felting needles into the loose fiber, the felting needles penetrating all the way through the fibrous material at the beginning of the process, and penetrating only part way through the fibrous material at the end of the process. The processes according to the invention eliminate one or more intermediate steps of forming coherent fibrous layers that were previously thought necessary in the prior art in order to form a thick fibrous structure.

50 Claims, 5 Drawing Sheets

U.S. PATENT DOCUMENTS

| | | | |
|---|---|---|---|
| 2,381,184 | 8/1945 | Ripl | 28/72.2 |
| 2,706,324 | 4/1955 | Cogovan | 28/72.2 |
| 2,774,296 | 12/1956 | Martinmaas, Jr. | 100/5 |
| 2,930,100 | 3/1960 | Rust, Jr. | 28/4 |
| 2,970,365 | 2/1961 | Morgenstern | 28/72.2 |
| 3,019,508 | 2/1962 | Reinhardt et al. | 28/72.2 |
| 3,090,101 | 5/1963 | Chagnon et al. | 28/72.2 |
| 3,166,823 | 1/1965 | Bernard | 28/72.2 |
| 3,205,342 | 9/1965 | Smith et al. | 219/549 |
| 3,257,259 | 6/1966 | Law . | |
| 3,451,885 | 6/1969 | Klein | 161/80 |
| 3,657,061 | 4/1972 | Carlson et al. | 161/81 |
| 3,756,893 | 9/1973 | Smith | 156/440 |
| 3,772,115 | 11/1973 | Carlson et al. | 156/148 |
| 3,829,939 | 8/1974 | Dilo | 28/4 R |
| 3,956,560 | 5/1976 | Smith, II | 28/111 |
| 3,994,762 | 11/1976 | Wrzeslen et al. | 156/178 |
| 4,284,680 | 8/1981 | Awano et al. | 428/234 |
| 4,621,662 | 11/1986 | Pierre Olry | 138/129 |
| 4,651,393 | 3/1987 | Dilo et al. | 28/111 |
| 4,780,363 | 10/1988 | Evans et al. | 428/300 |
| 4,790,052 | 12/1988 | Pierre Olry | 28/110 |
| 4,955,123 | 9/1990 | Lawton et al. | 29/419.1 |
| 5,081,754 | 1/1992 | Lawton et al. | 29/419.1 |
| 5,113,568 | 5/1992 | Lawton et al. | 29/419.1 |
| 5,184,387 | 2/1993 | Lawton et al. | 29/419.1 |
| 5,217,770 | 6/1993 | Morris, Jr. et al. | 428/36.3 |
| 5,226,217 | 7/1993 | Pierre Olry | 28/107 |
| 5,323,523 | 6/1994 | Lawton et al. | 29/419.1 |
| 5,388,320 | 2/1995 | Smith et al. | 29/419.1 |
| 5,390,217 | 2/1995 | Ioki et al. | 376/150 |
| 5,417,138 | 5/1995 | Morris, Jr. et al. | 87/31 |
| 5,503,254 | 4/1996 | Fisher et al. | 188/71.5 |
| 5,504,979 | 4/1996 | Sheehan et al. | 28/107 |
| 5,515,585 | 5/1996 | Sheehan et al. | 28/107 |
| 5,546,880 | 8/1996 | Ronyak et al. | 112/475 |
| 5,581,857 | 12/1996 | Sheehan et al. | 28/107 |
| 5,599,603 | 2/1997 | Evans et al. | 428/66.2 |
| 5,654,059 | 8/1997 | Hecht | 428/65.9 |
| 5,740,593 | 4/1998 | Sheehan et al. | 28/107 |

FOREIGN PATENT DOCUMENTS

| | | |
|---|---|---|
| 0530741A1 | 10/1993 | European Pat. Off. . |
| 0696730A2 | 2/1996 | European Pat. Off. . |
| 748881A1 | 12/1996 | European Pat. Off. . |
| 2306416 | 8/1974 | Germany . |
| 2911762 | 10/1980 | Germany . |
| 3214831A1 | 10/1983 | Germany . |
| 9310408 | 1/1994 | Germany . |
| 1308999 | 7/1973 | United Kingdom . |
| 1549687 | 1/1979 | United Kingdom . |
| 2012671A | 1/1979 | United Kingdom . |
| 2230491A | 10/1990 | United Kingdom . |
| 2099365A | 6/1994 | United Kingdom . |
| 2271155A | 6/1994 | United Kingdom . |
| 9101397 | 7/1991 | WIPO . |
| 9204492 | 3/1992 | WIPO . |
| 9612841 | 2/1996 | WIPO . |
| 9612842 | 2/1996 | WIPO . |
| 9720092 | 5/1997 | WIPO . |
| 9720092 | 6/1997 | WIPO . |

SIMPLIFIED PROCESS FOR MAKING THICK FIBROUS STRUCTURES

BACKGROUND

The invention relates to a process for making thick fibrous structures. More particularly, the invention relates to a simplified needle-felting process wherein fibrous material is accreted into a thick fibrous structure by repeatedly driving a multitude of felting needles into the fibrous material, the felting needles penetrating all the way through the fibrous material at the beginning of the process, and penetrating only part way through the fibrous material at the end of the process.

According to certain processes known in the art for making fibrous structures, several coherent fibrous layers are needled together in a series of needling steps wherein a multitude of felting needles are repeatedly driven into the fibrous layers. The felting needles are forked or barbed and engage fiber from the layers as they are driven into the layers, and permanently transport bundles of fibers between layers, the bundles of fibers cohering the individual layers into a coherent fibrous structure. In certain processes for making thick fibrous structures, the felting needles penetrate all the way through the fibrous layers disposed beneath the felting needles at the beginning of the process, and penetrate only part way through the fibrous layers disposed beneath the felting needles at the end of the process. Up to twenty, thirty, or more layers may be cohered into a fibrous structure. In such processes, each individual layer is typically previously prepared into a coherent layer in sheet form in the shape of a rectangle, annulus, or sector of an annulus. The coherent layers in sheet form may be made from various coherent fibrous materials, including woven fiber, knitted fiber, braided fiber, and previously felted fiber. Examples of typical processes for making thick fibrous structures in such manner are provided by U.S. Pat. Nos. 3,657,061, 4,790, 052, and 4,955,123. The intermediary process of making the individual coherent layers adds additional cost and complication to the overall process, but using only coherent layers to form a thick fibrous structure in the manner described was previously thought necessary to enable build-up of a thick fibrous structure, and in order to provide a thick fibrous structure having suitable physical characteristics.

An object of the invention is to provide a simplified process for making thick fibrous structures without affecting the ability of the process to form such structures, and without compromising physical characteristics. Processes according to various aspects of the invention are described herein that fulfill at least these objectives. Such processes are greatly simplified relative to prior art processes because loose fiber is directly accreted into a thick fibrous structure, without a prior step of cohering the fiber into individual coherent layers.

SUMMARY OF THE INVENTION

According to an aspect of the invention, a needle-felting process is provided comprising the steps of: feeding loose fiber into a needle-felting machine and repeatedly driving a multitude of felting needles into the loose fiber thereby binding the loose fiber into a coherent fibrous structure having a thickness that increases as loose fiber is accreted to the fibrous structure, wherein the multitude of felting needles initially penetrate all the way through the fibrous structure and eventually do not penetrate all the way through the fibrous structure as the thickness increases.

The processes according to the invention are greatly simplified relative to the prior art because raw loose fiber is directly used to form the thick fibrous structure. The processes according to the invention eliminate one or more intermediate steps of forming coherent fibrous layers that were previously thought necessary in the prior art in order to form a thick fibrous structure.

DETAILED DESCRIPTION

Figure 1:
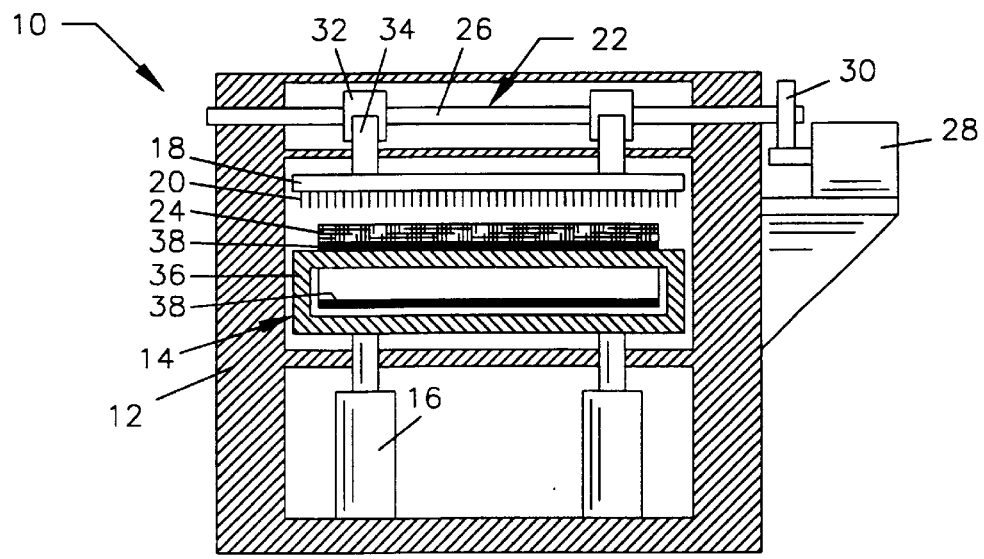
FIG. 1 is a schematic cross-sectional representation of a prior art needle-felting machine.

Various aspects of the invention are presented in FIGS. 2–6 and 8–9, which are not drawn to scale, wherein like components are numbered alike. Certain prior art needle-felting machines are presented in FIGS. 1 and 7, which are not drawn to scale. Referring now to FIG. 1, a partially sectional view of a prior art needle felting machine 10 is presented, that may be employed in the practice of various aspects of the invention. Needle felting machine 10 is presented in a greatly simplified form since such machines are very well known in the art, and a detailed description is not necessary here. Needle felting machine 10 comprises a machine frame 12, a needling support 14 mounted to an adjustment mechanism 16 that raises and lowers the needling support 14, a reciprocation mechanism 22 mounted to the machine frame 12, and a needling head 18 comprising a multitude of felting needles 20 facing the support 14. The needling head 18 is attached to the reciprocation mechanism 22, wherein the reciprocation mechanism 22 cyclically drives the multitude of felting needles 20 toward and away from the needling support 14 as fiber 24 is passed beneath the needling head 18 supported by the needling support 14. The reciprocation mechanism 22 may take various forms known in the art of needle felting machinery. In the example presented, the reciprocation mechanism 22 comprises a drive shaft 26 driven by a motor 28 through a drive train 30. A pair of cranks 32 are attached to the shaft 26, and a pair of needling head linkages 34 are attached to the cranks 32 and the needling head 18. The cranks 32 convert the rotary motion of the drive shaft 26 to translational up and down movement in the needling head linkages 34. The needling support may also take various forms known in the art of needle felting machinery. In the example presented, needling support 14 comprises a needling support frame 36, and a needle penetrable belt 38 spanning the length of the needling support frame 36. A belt drive mechanism (not shown) rotates the belt 38 around the needling support frame 36, which carries the fiber 24 toward the needling head 18, and the rotation of the belt 38 may be reversed. Thus, the fiber 24 may be passed back and forth beneath the needling head 18. The movement of the fibrous structure may be continuous, or intermittent and timed with the downstroke of the needles, the latter being preferred. Other types of needling supports may be employed, for example, two belts on either side of a perforated bed plate disposed beneath the needling head 18, or a translatable bed having a needle penetrable surface such as brush bristles, pins, or foamed rubber or plastic. Finally, the adjustment mechanism 16 may take various forms known in the art of needle felting machinery, such as one or more jack screws, hydraulic cylinders, or other suitable mechanisms that may be employed to repeatedly position the needling support 14 with suitable accuracy.

Figure 2:
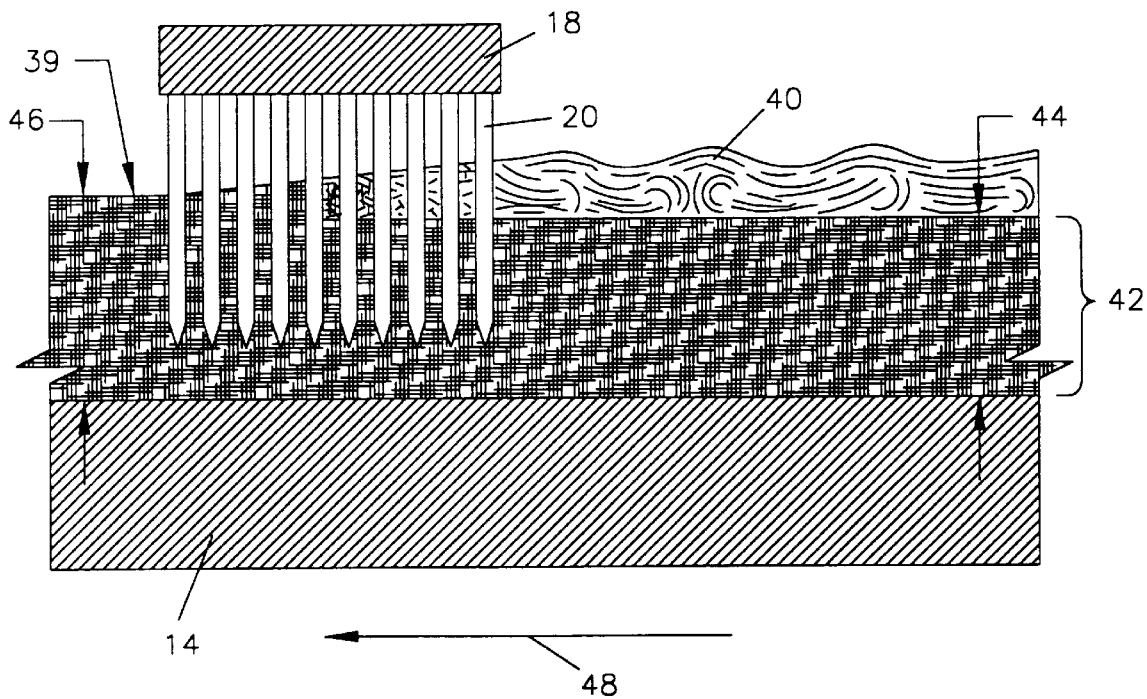
FIG. 2 is a cross-sectional side view of a process according to an aspect of the invention.

Referring now to FIG. 2, a process for making a thick fibrous structure 39 is presented according to an aspect of the invention is presented. The process comprises the steps of (1) disposing a mass of loose fiber 40 over a coherent fibrous structure 42 having a thickness 44; (2) accreting the mass of loose fiber 40 to the fibrous structure 42, thereby increasing the thickness 44 (as indicated at 46), by repeatedly driving the multitude of felting needles 20 through the mass of loose fiber 40 into the fibrous structure 42 without penetrating all the way through the fibrous structure 42; and, (3) repeating the previous two steps a multitude of times until the thickness 44 reaches a desired thickness. As used herein, the term "coherent fibrous structure" means that the fibers forming the fibrous structure are interlocked by means of a textile process into a textile structure. Examples of coherent fibrous structures include, but are not limited to woven fiber, knit fiber, braided fiber, spun-bonded fiber, and entangled fiber by felting or needling. As used herein, the term "loose fiber" means fiber that is not in the form of a coherent fibrous structure. Loose fiber includes crimped and uncrimped fiber, and may be comprised of continuous filaments or staple fiber, or mixtures of these, and may be in the form of tows, rovings, slivers, and fiber obtained by opening and/or tearing apart coherent fibrous structures ("recycled"). Loose fiber also includes a mass of loose yarns or threads. Many types of fibers may be employed in the practice of the invention, including both natural and man-made fibers, carbon fibers and precursors of carbon fibers, and ceramic fibers and precursors of ceramic fibers. The invention may be employed with man-made fibers having a smooth surface and no crimp, and the loose fiber may consist of, or consist essentially of, fibers having a smooth surface and no crimp. As used herein, the term "accreting" means a process of growth or enlargement by a gradual buildup, for example, wherein the thickness of the fibrous structure increases as fiber is added and needled to it. The faces of the fibrous structure preferably are generally flat and uniform during each step of the needle-felting process. The needling density (needle penetrations per square centimeter) may vary, or be constant, over the surface of the fibrous structure 42, with the latter being preferred. The fibrous structure 42 may be held at the same position relative to the felting needles, or may be moved relative to the felting needles, as the thickness increases. In certain embodiments, the fibrous structure 42 is moved away from the felting needles a distance approximately equal to the amount by which the thickness increases each time loose fiber is accreted to it.

The desired thickness depends on the use intended for the fibrous structure 39. For use as an aircraft brake disk preform, or for a similar disk, a thickness on the order of 2 (two) to 8 (eight) centimeters thick is generally desired. However, even thicker fibrous structures are contemplated in the practice of the invention. According to a preferred embodiment, at least 2 (two) centimeters of fiber is accreted to the fibrous structure. The felting needles 20 are forked or barbed, and engage fiber from the mass of loose fiber 40 and transport the fiber engaged by the needles 20 into the coherent fibrous structure 42, which compacts the mass of loose fiber 40 and coheres it to the fibrous structure 42. According to this aspect of the invention, the coherent fibrous structure has sufficient thickness to permit the felting needles to transport fiber into it without penetrating all the way through the fibrous structure. The coherent fibrous structure may include one or more layers of cohered fibrous material. As presented in FIG. 2, the fibrous structure 42 may comprise a multitude of fibrous layers previously cohered by needling. Thus, the mass of loose fiber 40 is accreted to, and becomes a part of, the fibrous structure 42. The fibrous structure 42 is moved in a feed direction indicated by arrow 48 as the needling head 18 is reciprocated, resulting in the mass of loose fiber 40 preferably being cohered to the fibrous structure 42 along the full length of the fibrous structure 42. The fibrous structure 42 is moved by moving the needling support 14, or by moving a belt upon which the fibrous structure 42 is disposed, as previously described in reference to FIG. 1, or by another suitable method. According to various aspects of the invention, the loose fiber 40 may, without limitation, comprise unidirectional loose fiber, bidirectional loose fiber, multidirectional loose fiber, and/or disordered loose fiber. The loose fiber 40 may be disposed over the coherent fibrous structure 42 parallel to the feed direction 48, transverse to the feed direction 48, and/or at an angle to the feed direction 48.

Figure 3:
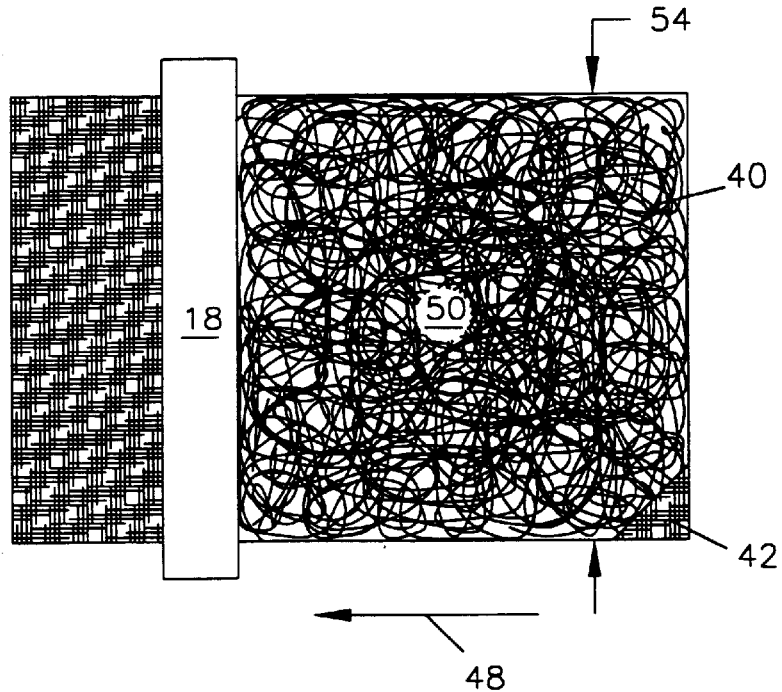
FIG. 3 is a top view of a process according to an aspect of the invention.
Figure 4:
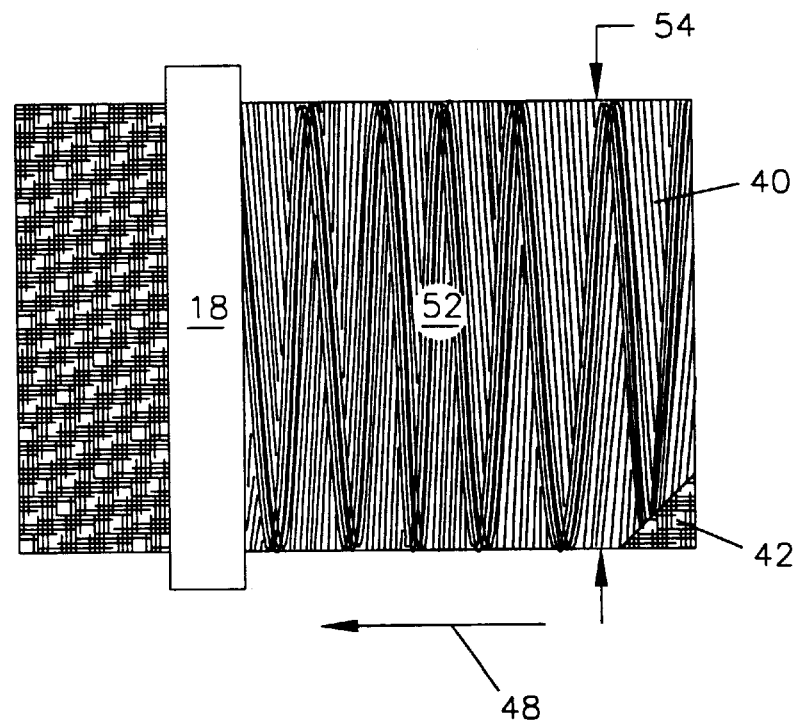
FIG. 4 is a top view of a process according to an aspect of the invention.

Referring now to FIG. 3, a top view of the FIG. 2 process is provided according to a further aspect of the invention wherein the mass of loose fiber is disposed as a disordered mass 50 over the fibrous structure 42. As used herein, "disordered" means an assemblage of fiber mingled together without order, a confused mass. According to a certain embodiment, at least a portion of the loose fiber is supplied as continuous fiber and/or staple fiber and is fluffed and agitated into a disordered mass. As used herein, the term "fluffing" means separating the loose fiber in a manner that causes it to occupy a greater volume, and "fluffed" means having been subjected to a fluffing process. According to another certain embodiment, all of the mass of loose fiber, for every step of disposing the mass of loose fiber over the coherent fibrous structure 42, is a disordered mass. The disordering process may comprise one or more of the steps of heaping loose fiber onto the needling support or fibrous structure ahead of the needle head 18, pulling the loose fiber apart, lifting the loose fiber and letting it drop, agitating the loose fiber transverse to the feed direction 48, and spreading the loose fiber transverse to the feed direction 48 before it passes beneath the needling head 18. "Transverse to the feed direction" means roughly perpendicular to the feed direction 48 and parallel to the surface of the coherent fibrous structure 42 over which the loose fiber is being spread. According to a preferred embodiment, the loose fiber 40 is disposed onto the needling support about parallel to the feed direction 48 and is subsequently disordered by lifting and dropping the loose fiber 40, agitating the loose fiber 40, and spreading the loose fiber 40 transverse to the feed direction. One or more of the disordering steps may also fluff the fiber. Referring now to FIG. 4, a top view of the FIG. 2 process is provided according to another aspect of the invention wherein at least a portion of the mass of loose fiber is a crosslapped mass of loose-fiber 52 disposed over the fibrous structure 42. As used herein, cross-lapped means that the loose fiber is spread back and forth transverse to the feed direction 48, the individual laps partially overlapping each other and forming acute angles with each other, as shown in FIG. 4. Suitable cross-lapping mechanisms may be employed to cross-lap the fiber. The cross-lapped fiber may be lapped using unidirectional or disordered fiber, as well as loose fiber in other forms. The fiber may be spread across the full width 54 (transverse to the feed direction 48) of the fibrous structure 42, as shown in FIGS. 3 and 4, or across only part of the full width 54 of the fibrous structure 42. According to a certain embodiment, loose fiber is cross-lapped over the fibrous structure and then spread parallel to the feed direction 48 before passing beneath the felting needles 20. The mass of loose fiber 40, for every step of disposing the mass of loose fiber 40 over the coherent fibrous structure 42, may be comprised of cross-lapped loose fiber 52 disposed over disordered loose fiber 50.

According to a further aspect of the invention, the process may further comprise the steps of disposing at least one coherent layer in sheet form over the fibrous structure 42, the coherent layer in sheet form being selected from the group consisting of woven fiber, knitted fiber, braided fiber, and previously entangled fiber by needling or felting; and, accreting the layer in sheet form to the fibrous structure 42, by repeatedly driving a multitude of felting needles through the layer in sheet form into the fibrous structure without penetrating all the way through the fibrous structure. This step may be alternated with one or more steps of accreting loose fiber to the fibrous structure 42. The resulting fibrous structure is a heterogenous needled structure having alternating layers of dissimilar textile structures. As used herein, the term "sheet form" is used according to its common meaning that the layer is thin in comparison to its length and breadth.

Figure 5:
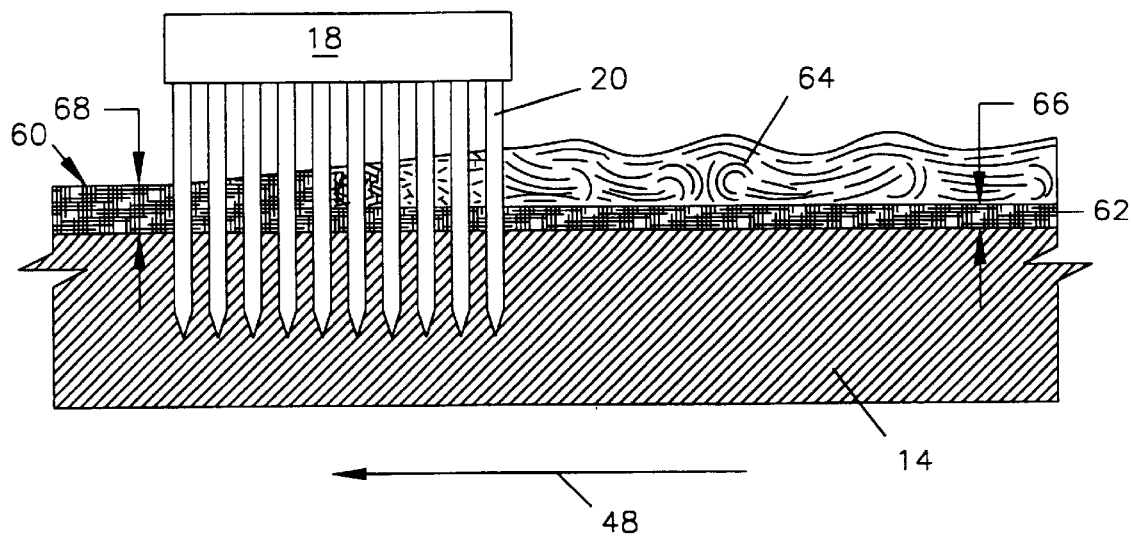
FIG. 5 is a cross-sectional side view of a process according to an aspect of the invention.
Figure 6:
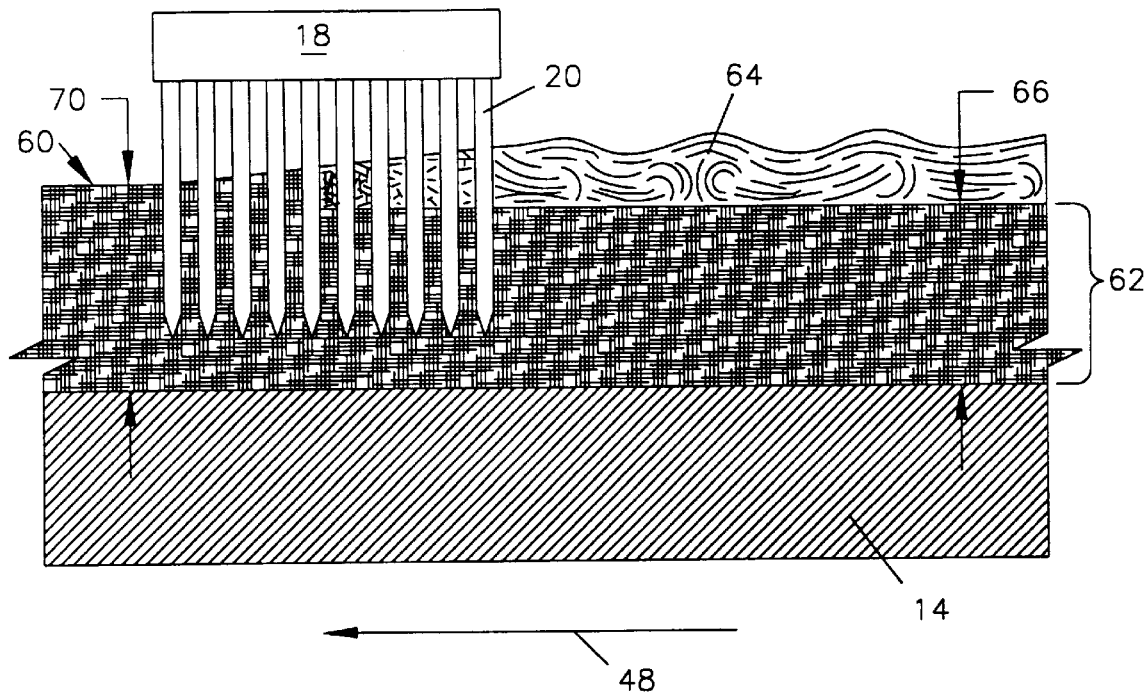
FIG. 6 is a cross-sectional side view of a process according to an aspect of the invention.

Referring now to FIGS. 5 and 6, a process for making a thick needled fibrous structure 60 according to a further aspect of the invention is presented. The process comprises the steps of: (1) disposing a mass of loose fiber 64 over a coherent fibrous structure 62 having a thickness 66; (2) accreting the mass of loose fiber 64 to the fibrous structure 62 by repeatedly driving a multitude of felting needles 20 through the mass of loose fiber into the fibrous structure 62; and, (3) progressively increasing the thickness 66 (as indicated by thickness 68) until it reaches a desired thickness 70 by repeating the previous two steps a multitude of times, wherein the multitude of felting needles 20 penetrate all the way through the fibrous structure 62 at the beginning of the multitude of times, as shown in FIG. 5, and do not penetrate all the way through the fibrous structure 62 at the end of the multitude of times, as shown in FIG. 6. According to a preferred embodiment the multitude of felting needles 20 penetrate the needling support 14 the first time the previous two steps are performed (steps 1 and 2), and do not penetrate the needling support 14 the last time the previous two steps (steps 1 and 2) are performed. In certain embodiments, the two steps are repeated at least 10 times, and are repeated as many as 20 (twenty), 30 (thirty), or more, times, resulting in a needled fibrous structure 60 having a substantial thickness. The felting needles 20 initially penetrate all the way through the fibrous structure 60 (which may have two, three, or more layers of accreted loose fiber), as shown in FIG. 5, and eventually do not penetrate all the way through the fibrous structure 60 as the thickness increases, as shown in FIG. 6.

According to a preferred embodiment, the coherent fibrous structure 62 at the beginning of the process, as presented in FIG. 5, is a fabric sheet that forms an initial layer disposed immediately adjacent to the needling support 14. According to a preferred embodiment, the coherent fibrous structure 62 at the beginning of the process is a cotton chafer fabric having 23 warp ends per inch and 23 picks per inch, and a cotton count of warp and filling of 2.5–2.75, available as Style G1250 from Eastbank Textiles/Eastbank Trading Co., Macon, Ga., U.S.A., and manufactured by Walton Monroe Mills Inc., Monroe, Georgia, U.S.A. As previously described in relation to FIGS. 3 and 4, at least a portion of the mass of loose fiber 64 may be cross-lapped, and at least a portion of the mass of loose fiber 64 may be a disordered mass disposed over the fibrous structure 62. According to a certain embodiment, all of the mass of loose fiber 64, for every step of disposing the mass of loose fiber 64 over the coherent fibrous structure 62, is a disordered mass. According to a preferred embodiment, for every step of disposing the mass of loose fiber 64 over the coherent fibrous structure 62, the mass of loose fiber 64 is comprised of cross-lapped loose fiber disposed over disordered loose fiber. According to this embodiment, the needled layers comprising the needled fibrous structure 62 comprise layers formed from a disordered mass of loose fiber interleaved with layers formed from cross-lapped loose fiber. The disordered mass of loose fiber acts a carrier which greatly improves uniformity of the cross-lapped fiber after needling.

Still referring to FIGS. 5 and 6, and according to a further aspect of the invention, the process may further comprise the steps of disposing at least one coherent layer in sheet form over the fibrous structure 62, the coherent layer in sheet form being selected from the group consisting of woven fiber, knitted fiber, braided fiber, and previously felted fiber; and, accreting the layer in sheet form to the fibrous structure 62, by repeatedly driving a multitude of felting needles through the layer in sheet form into the fibrous structure without penetrating all the way through the fibrous structure. This step may be alternated with one more steps of accreting loose fiber to the fibrous structure 62. The resulting fibrous structure is a heterogenous needled structure having alternating layers of dissimilar textile structures.

According to a further aspect of the invention, a coherent fibrous structure may be formed by disposing a mass of loose fiber over a needling support and forming a coherent fibrous structure having a thickness by repeatedly driving a multitude of felting needles through the mass of loose fiber into the needling support. Additional loose fiber may be accreted to the coherent fibrous structure thus formed according to the methods disclosed herein.

Figure 7:
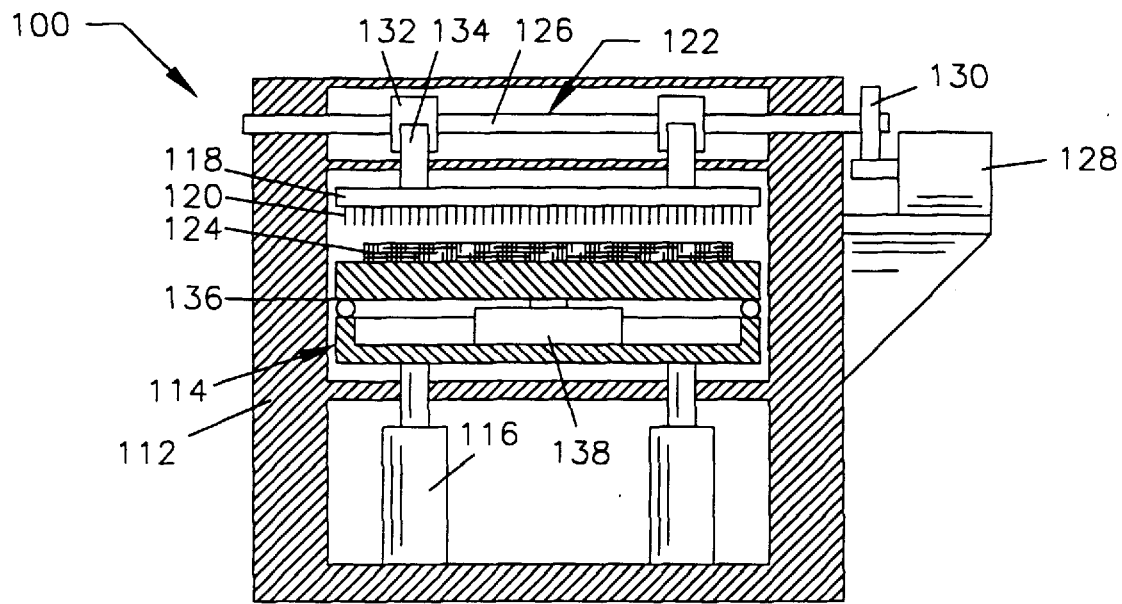
FIG. 7 is a schematic cross-sectional representation of a prior art rotary needle-felting machine.

Referring now to FIG. 7, a partially sectional view of a prior art rotary needle felting machine 100 is presented that may be employed in various further aspects of the invention. Examples of rotary needle felting machines and processes are described in U.S. Pat. Nos. 5,513,423, 5,217,770 and 4,955,123, and German national application DE 2911762 A1. The processes described in relation to FIGS. 2–6 may be applied to the rotary needle felting machine 100. The rotary needle felting machine 100 is presented in a greatly simplified form since such machines are very well known in the art, and a detailed description is not necessary here. Needle felting machine 100 comprises a machine frame 112, a rotary needling support 114 mounted to an adjustment mechanism 116 that raises and lowers the rotary needling support 114, a reciprocation mechanism 122 mounted to the machine frame 112, and a needling head 118 comprising a multitude of felting needles 120 facing the support 114. The needling head 118 is attached to the reciprocation mechanism 122, wherein the reciprocation mechanism 122 cyclically drives the multitude of felting needles 120 toward and away from the needling support 114 as fiber 124 is passed beneath the needling head 118 supported by the needling support 114. The reciprocation mechanism 122 may take various forms known in the art of needle felting machinery. In the example presented, the reciprocation mechanism 122 comprises a drive shaft 126 driven by a motor 128 through a drive train 130. A pair of cranks 132 are attached to the shaft 126, and a pair of needling head linkages 134 are attached to the cranks 132 and the needling head 118. The cranks 132 convert the rotary motion of the drive shaft 126 to translational up and down movement in the needling head linkages 134. The rotary needling support 114 is rotated by a rotation mechanism 138, which may provide continuous movement or may be configured to momentarily stop the rotary needling supports the moment the felting needles 20 are driven into the rotary needling support 114. The rotary needling support 114 may also take various forms known in the art of needle felting machinery, and is usually a rotatable table having a needle penetrable surface such as brush bristles, pins, or foamed rubber or plastic. Finally, the adjustment mechanism 116 may take various forms known in the art of needle felting machinery, such as one or more jack screws, hydraulic cylinders, or other suitable mechanisms that may be employed to repeatedly position the needling support 14 with suitable accuracy.

Figures 8A, 8B:
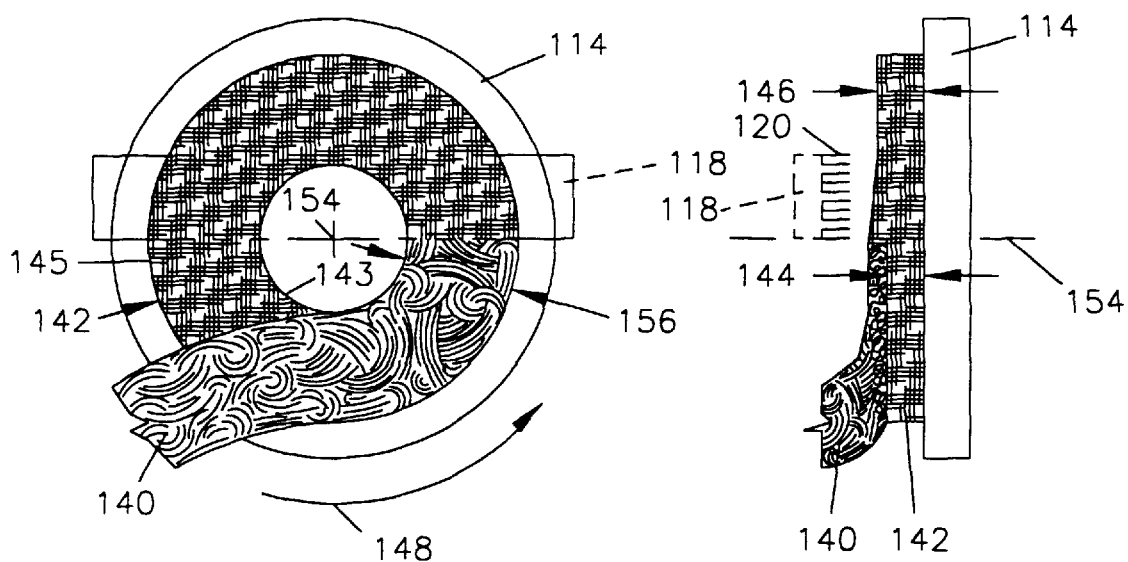
FIG. 8 provides top view and side views of a process according to an aspect of the invention.

Referring now to FIG. 8, a process for making a thick needled fibrous structure is provided, according to a further aspect of the invention, which may be employed using the rotary needle felting machine 100 of FIG. 7. Still referring to FIG. 8, both a top view (left) and a side view (right) are presented. The thick fibrous structure thus formed is disk shaped, and preferably annular. The process comprises the steps of (1) disposing a mass of loose fiber 140 over a coherent fibrous structure 142 while rotating the fibrous structure 142 about an axis of rotation 154, the fibrous structure 142 having a thickness 144; (2) accreting the mass of loose fiber 140 to the fibrous structure 142, thereby increasing the thickness 144 (indicated by 146), by repeatedly driving a multitude of felting needles 120 through the mass of loose fiber 140 into the fibrous structure 142 without penetrating all the way through the fibrous structure 142; and, (3) repeating the previous two steps a multitude of times until the thickness 144 reaches a desired thickness. The rotary needling support 114, the fibrous structure 142, and the loose fiber 140 rotate in a feed direction 148 about an axis of rotation 154 as the needling head 118 (shown in phantom) reciprocates. As previously described in relation to FIGS. 3 and 4, the mass of loose fiber 140 may be disposed over the fibrous structure 142 as a disordered mass, and/or it may be cross-lapped over the fibrous structure 142 (preferably back and forth in a radial direction). According to a certain embodiment, the mass of loose fiber 140, for every step of disposing the mass of loose fiber over the coherent fibrous structure 142, is a disordered mass. In addition, at least one layer in sheet form may be disposed over the fibrous structure 142 and accreted to the fibrous structure 142 by needling, the layer in sheet form being selected from the group consisting of woven fiber, knitted fiber, braided fiber, and previously felted fiber. The fiber may be spread across the full width 156 (transverse to the feed direction 148) between the inside peripheral surface 143 and outside peripheral surface 145 of the of the annular fibrous structure 142 (referred to herein as the "web" of the annular fibrous structure or fibrous structure), as shown in FIGS. 8, or across only part of the full width 156 between the inside peripheral surface 143 and outside peripheral surface 145 of the fibrous structure 142. The needling density (needle penetrations per square centimeter) may vary, or be constant, over the surface of the fibrous structure 142, with the latter being preferred. Though described in relation to the needle-felting machine of FIG. 7, wherein the needling support has a flat face and is rotated about an axis perpendicular to the flat face to which the loose fiber is applied, using needling supports having other geometries is contemplated in the practice of the invention, for example a needling support having a cylindrical or frustoconical outer surface, or other surface of revolution, to which the loose fiber is applied and needled as the surface is rotated about an axis of rotation.

According to a preferred embodiment, the coherent fibrous structure 62 at the beginning of the process is a fabric sheet that forms an initial layer disposed immediately adjacent to the rotary needling support 114, as described in copending patent application entitled "Rotary Needling Process and Support for Making Needled Fibrous Structures" filed Dec. 20, 1996, and bearing Ser. No. 08/771,555, the entire contents of which are incorporated herein by reference (hereinafter the "Rotary Needling Support Application"). The fabric sheet is preferably a cotton chafer fabric, as previously described herein.

According to a further aspect of the invention, a coherent fibrous structure may be formed by disposing a mass of loose fiber over a needling support and forming a coherent fibrous structure having a thickness by repeatedly driving a multitude of felting needles through the mass of loose fiber into the needling support. Additional loose fiber may be accreted to the coherent fibrous structure thus formed according to the methods disclosed herein.

Figure 9:
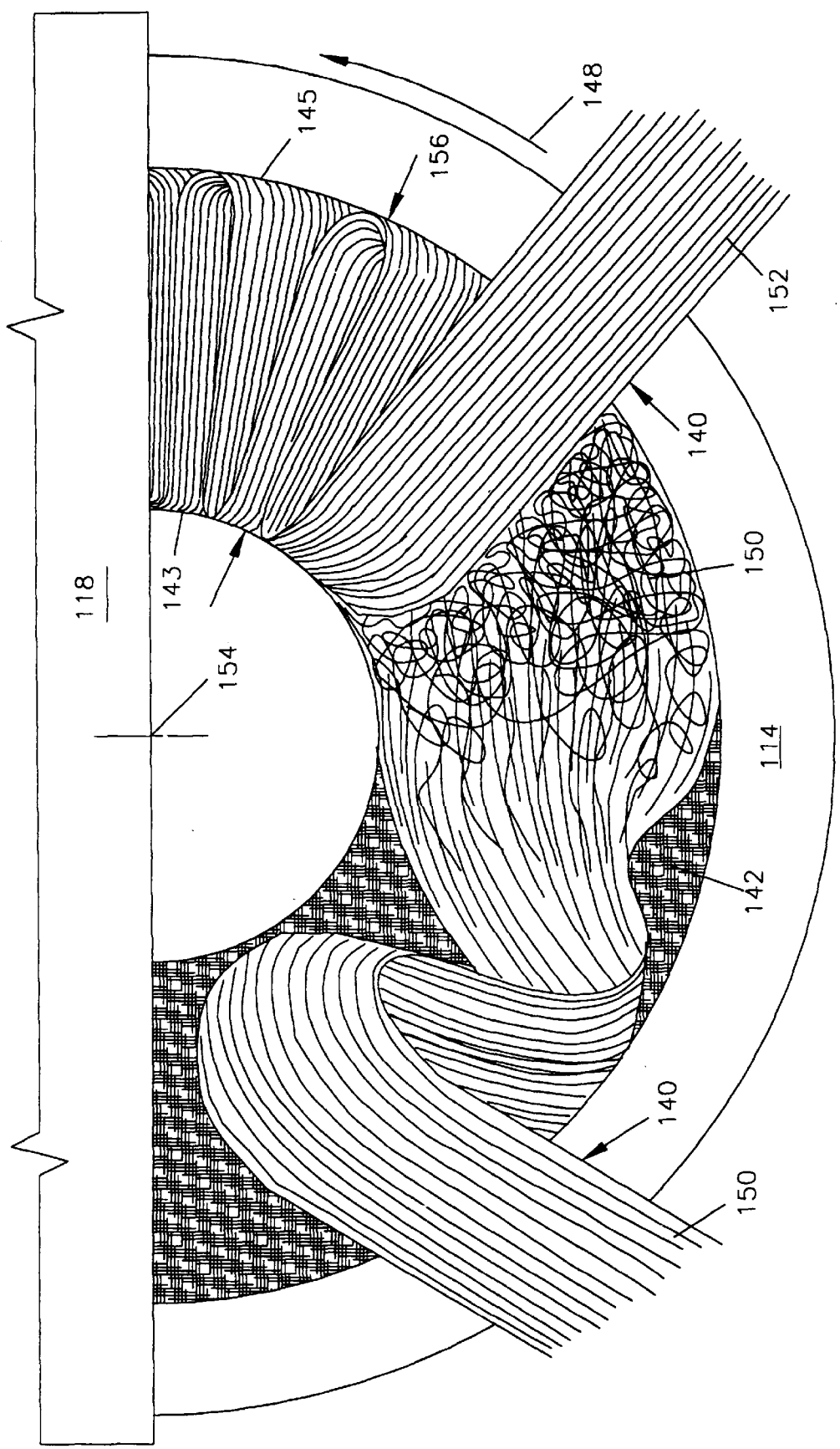
FIG. 9 is an enlarged partial top view of a process according to an aspect of the invention.

Referring now to FIG. 9, a process according to a preferred embodiment is presented wherein an annular thick needled fibrous structure is produced according to a further aspect of the invention. As presented in FIG. 9, the mass of loose fiber 140 comprises a disordered mass of loose fiber 150 disposed immediately adjacent the fibrous structure 142, and cross-lapped loose fiber 152 disposed over and immediately adjacent the disordered mass of loose fiber 150 before passing beneath the needling head 118. According to a certain embodiment, wherein the mass of loose fiber 140, for every step of disposing the mass of loose fiber 140 over the coherent fibrous structure 142, is comprised of a cross-lapped loose fiber 152 disposed over disordered loose fiber 150. With this embodiment, the fiber is spread across the full width 156 between the inside peripheral surface 143 and outside peripheral surface 145 of the of the annular fibrous structure 142 during most of the process during most or all of the process. The loose fiber 140 may also be spread only partly across the full width 156.

In any of the processes described thus far, the fibrous structure may develop an area of reduced thickness relative to another area, and the process may further comprise the step of accreting extra fiber to the area of reduced thickness. The variations may be caused by variations in the quantity of fiber accreted, or may be caused by naturally occurring tendencies in the process. For example, with reference to FIG. 8, the annular fibrous structure 142 may develop an annular area of reduced thickness proximate the inside peripheral surface 143, and the process may further comprise the step of accreting extra fiber to the area of reduced thickness, which increases the thickness of that particular area. The variation of thickness proximate the inside peripheral surface 143 may be caused by the rotary needling process which may tend to urge fiber outward away from the axis of rotation 154. According to a certain embodiment, the step of accreting extra fiber to the area of reduced thickness is the final step in the needle-felting process.

In a rotary needling process according to the invention, the loose fiber may be disposed adjacent the inside peripheral surface of the fibrous structure to be formed and spread across only part of the width of the web of the annular structure. Thus, the loose fiber may be spread less than the width of the web, and urged toward the inside peripheral surface of the annular fibrous structure before passing beneath the felting needles. The felting needles tend to force the fiber toward the outside peripheral surface, and the loose fiber is positioned before the felting needles such that the width of the needled fiber as it emerges from the felting needles corresponds to the desired width of the web of the annular structure, thus compensating for the tendency of the felting needles to urge the fiber outward.

According to a further aspect of the invention, fiber reinforced composite materials may be formed by impregnating or depositing a matrix within any of the fibrous structures produced by the processes described thus far. Thick fibrous structures used in fiber reinforced composite materials are often referred to as "preforms" in the art. Various processes may be employed, alone or in combination, to deposit a matrix within the fibrous structure including, without limitation, resin impregnation, chemical vapor infiltration and deposition, resin or pitch impregnation with subsequent pyrolyzation, and infiltration of a precursor liquid with subsequent decomposition and deposition as described in European Patent Application 0 592 239 A2. According to a preferred embodiment, a matrix is deposited within a fibrous structure produced by a needling process, as described herein, by a CVI/CVD process (including isothermal, temperature gradient, and pressure gradient without limitation). As used herein, the term "CVI/CVD" means chemical vapor infiltration and deposition of a matrix within a porous structure. At least part of the matrix may be deposited by a conventional CVI/CVD process and/or at least part of the binding matrix may be deposited by a pressure gradient CVI/CVD process. As used herein, the term "conventional CVI/CVD" means the type of CVI/CVD process known in the art in which a reactant gas passes around a heated porous structure and diffuses into the porous structure driven by concentration gradients and the gas cracks to deposit a matrix. As used herein, the term "pressure gradient CVI/CVD" means the type of CVI/CVD process known in the art in which the reactant gas is forced to flow through a porous structure by inducing a pressure gradient from one surface of the porous structure to an opposing surface of the porous structure. As used herein, the term "thermal gradient CVI/CVD" means the type of CVI/CVD process known in the art in which the porous structure is heated in a manner that generates steep thermal gradients that induce deposition of the matrix in a desired portion of the porous structure. A process according to an aspect of the invention comprises the steps of depositing a first matrix within the fibrous structure by a pressure gradient CVI/CVD process followed by depositing a second matrix within the fibrous structure by a conventional CVI/CVD process. According to a particularly preferred process for making friction disks, an annular fibrous structure is produced according to one of the processes described herein, and is subsequently pressure gradient CVI/CVD densified. For making a carbon/carbon friction disk, the annular fibrous structure may be entirely composed of carbonaceous fiber, preferably oxidized polyacrylonitrile fiber (OPF), and a carbon matrix is deposited within the fibrous structure. In such an embodiment, the loose fiber preferably consists essentially of a 320K OPF tow that is deposited on a rotary needle machine, as described in FIGS. 7–9. As used herein, the term "carbonaceous" means containing or composed of carbon. The matrix is preferably a pyrolytic carbon including a rough laminar microstructure. A fibrous structure comprising OPF fiber is preferably heated to carbonize the OPF fiber before the binding matrix is deposited. The pyrolytic carbon matrix may be initially deposited by a pressure gradient CVI/CVD process followed by a conventional CVI/CVD process, with or without an intermediate or final heat treat that increases the graphitization of a previously deposited carbon matrix. Suitable processes and apparatus for depositing a binding matrix within a porous structure, which may be applied to fibrous structures described herein, are described in U.S. application for patent Ser. No. 08/340,510 entitled "Pressure Gradient CVI/CVD Apparatus, Process, and Product", filed Nov. 16, 1994, and U.S. Pat. No. 5,480,678 issued Jan. 2, 1996, entitled "Apparatus for Use with CVI/CVD Processes", both of which are fully incorporated herein by reference. Though just described in relation to a particular friction disk application, other forms or types of fiber or matrix may be employed in the practice of the invention for friction disks and other applications.

In any of the aspects of the invention discussed thus far, the loose fiber is preferably disposed over the coherent fibrous structure just ahead of the felting needles, and is carried beneath the felting needles by movement of the needling support without forcing the fiber beneath the felting needles. In other words, the felting needles naturally tend to take the fiber at a rate, and it is preferable to avoid forcing fiber beneath the felting needles faster than that rate. This method tends to produce a fibrous structure having a more uniform surface with less needle breakage. However, it is not intended to limit the invention to any particular rate of feeding fiber beneath the felting needles.

Additional fiber may be added and needled to particular areas of the fibrous structure in order to locally increase fiber volume. In a rotary process, for example, additional fiber may be added proximate the inside peripheral surface and/or outside peripheral surface of an annular fibrous structure in order to locally increase fiber volume and increase strength in the lug area of a friction disk such as an aircraft brake disk.

EXAMPLE 1

An annular coherent fibrous structure having an inside diameter of about 27 (twenty-seven) centimeters and an outside diameter of about 63 (sixty-three) centimeters was manufactured as follows using a rotary needling machine as described in U.S. Pat. No. 5,513,423 to Jakob et al. issued May 7, 1996, with a rotary needling support having the cotton chafer fabric (the initial coherent fibrous structure) previously described herein overlying a brush bristle needling support as described in the "Rotary Needling Support Application." The rotary needling support had a circular flat face that was concentric with an axis of rotation perpendicular to the flat face, and a cylindrical guide was provided adjacent the inside peripheral surface of the annular fibrous structure to be formed. A multitude of felting needles were mounted to a needle board which was reciprocated parallel to the axis of rotation, all in known manner. The felting needles used in this process were part number F-20 4-22-3B 1 B/E (350T) 15×18×36×3.5 SBA (5236934 SB) four barb needles available from Foster Needle Co, Inc., Manitowoc, Wis., U.S.A. Two boxes of 320K OPF tow were provided. A first length of tow was fed directly from the box and radially cross-lapped onto the cotton chafer fabric the width of the web of the annular structure to be formed, just ahead of the felting needles. Rotation of the needling support and reciprocation of the needle board was then begun and the cross-lapped fiber began passing beneath the reciprocating needling head as the needling support and fabric were rotated around the axis of rotation a first full revolution, thereby forming an annular coherent fibrous structure consisting of the fabric and the cross-lapped fiber needled to the fabric. Just before the beginning of the second revolution, tow was then fed directly from the second box onto the coherent fibrous structure and disordered, and the tow from the first box was radially cross-lapped onto the disordered tow before both were passed together beneath the needling head, as shown in FIG. 9. Thus, just before the beginning of the second revolution, the loose fiber consisted of cross-lapped tow laying on top of disordered loose tow, both of which were continuously passed beneath the needling head as it was reciprocated, thereby accreting the loose fiber to the fibrous structure. Tow from the second box was disordered by heaping the tow onto the fabric ahead of the felting needles roughly parallel to the feed direction, lifting and dropping the heaped tow, and spreading the heaped tow transverse to the feed direction in order to obtain a uniformly random pile of loose fiber of generally uniform thickness across the web of the annular structure. The tow from the second box was cross-lapped in a radial direction with an obvious angle and no gap present, as shown in FIG. 9, and spread a few centimeters parallel to the feed direction in order to make it more uniform. The distance between cross-lapped loops of tow at the outside diameter was about 10 (ten) to 15 (fifteen) centimeters. This process was continued until the annular fibrous structure reached a thickness of about 5 (five) centimeters corresponding to 22 (twenty-two) full revolutions of the needling support. During the process, the loose fiber was urged toward the inside peripheral surface of the annular fibrous structure in order to counteract a tendency of the needling action to drive the fiber toward the outside peripheral surface. Initial penetration depth of the felting needles during the initial revolution of the needling support was 9.5 mm, and the needling density was held constant at 214 penetrations/square centimeter throughout the process. The penetration depth was held constant the first 5 (five) full revolutions of the needling support. At the beginning of the sixth revolution, and at the beginning of every revolution that fiber was added thereafter (up to and including the twenty-second revolution), the needling support was moved downward (away from the needles) an incremental step of 2.4 mm. A final finishing needling step was performed consisting of three full revolutions without adding fiber (after the first twenty-two revolutions), with an incremental downward movement of the needling support of 2.4 mm at the beginning of each revolution. The fibrous structure was then removed from the needling support, and die cut to provide an annular shape having a clean inside and outside peripheral surfaces perpendicular to the faces of the annulus, and the faces were generally flat and uniform.

A fairly broad range of needling parameters may be employed in the practice of the invention, depending on the type of loose fiber. For example, fibrous structures have been generated using a process similar to Example 1, with an initial penetration depth in the range of 7 (seven) to 14 (fourteen) millimeters, inclusive, and a needling density of in the range of 100 to 400 penetrations per square centimeter, inclusive. According a certain embodiment employing 320K OPF tow with no crimp, the initial penetration depth is in the range of 9 (nine) to 10 (ten) millimeters, inclusive, and the needling density is in the range of 150 to 250 penetrations per square centimeter. These needling parameters may be applicable to the various aspects of the invention described herein in relation to FIGS. 2–6 and 8–9, and to fiber types other than OPF. The range of needling parameters that will produce a suitable fibrous structure for a particular application may be dependent on the specific type of fiber, and the particular needling process, and may be narrower or broader than the ranges stated above.

It is evident that many variations are possible without departing from the true scope and spirit of the invention as defined by the following claims.

We claim:

1. A needle-felting process, comprising the steps of:
   feeding loose fiber into a needle-felting machine while repeatedly driving a multitude of felting needles into said loose fiber thereby binding said loose fiber into a coherent fibrous structure having a thickness that increases as loose fiber is accreted to said fibrous structure wherein said multitude of felting needles initially penetrate all the way through said fibrous structure and eventually do not penetrate all the way through said fibrous structure as said thickness increases.

2. The process of claim 1, wherein said loose fiber comprises disordered fiber and cross-lapped fiber.

3. The process of claim 1, wherein said loose fiber consists of disordered loose fiber.

4. The process of claim 1, further comprising the step of accreting at least one coherent layer in sheet form to said fibrous structure.

5. A needle felting process, comprising the steps of:
   disposing loose fiber over a coherent fibrous structure having a thickness;
   accreting said loose fiber to said fibrous structure, thereby increasing said thickness, by repeatedly driving a multitude of felting needles through said loose fiber into said fibrous structure without penetrating all the way through said fibrous structure; and,
   repeating the previous two steps a multitude of times until said thickness reaches a desired thickness.

6. The process of claim 5, wherein said step of disposing loose fiber includes the step of disposing cross-lapped loose fiber over said fibrous structure.

7. The process of claim 5, wherein said step of disposing loose fiber includes the step of disposing disordered loose fiber over said fibrous structure.

8. The process of claim 5, further comprising the step of fluffing and agitating at least a portion of said loose fiber.

9. The process of claim 5, wherein all of said loose fiber is disordered.

10. The process of claim 5, wherein all of said loose fiber is cross-lapped fiber alternated with disordered fiber.

11. The process of claim 5; further comprising the steps of:
   disposing at least one coherent layer in sheet form over said fibrous structure; and,
   accreting said coherent layer in sheet form to said fibrous structure, thereby increasing said thickness, by repeatedly driving a multitude of felting needles through said coherent layer in sheet form into said fibrous structure without penetrating all the way through said fibrous structure.

12. The process of claim 5, wherein said loose fiber comprises continuous filaments.

13. The process of claim 5, wherein said loose fiber comprises staple fiber.

14. A needle-felting process, comprising the steps of:
disposing loose fiber over a coherent fibrous structure having a thickness;
accreting said loose fiber to said fibrous structure by repeatedly driving a multitude of felting needles through said loose fiber into said fibrous structure; and,
progressively increasing said thickness until it reaches a desired thickness by repeating the previous two steps a multitude of times, wherein said multitude of felting needles penetrate all the way through said fibrous structure at the beginning of said multitude of times, and do not penetrate all the way through said fibrous structure at the end of said multitude of times.

15. The process of claim 14, wherein said step of disposing loose fiber includes the step of disposing cross-lapped loose fiber over said fibrous structure.

16. The process of claim 14, wherein said step of disposing loose fiber includes the step of disposing disordered loose fiber over said fibrous structure.

17. The process of claim 14, further comprising the step of fluffing and agitating at least a portion of said loose fiber.

18. The process of claim 14, wherein all of said loose fiber is disordered.

19. The process of claim 14, wherein all of said loose fiber is cross-lapped fiber alternated with disordered fiber.

20. The process of claim 14, further comprising the steps of:
disposing at least one layer in sheet form over said fibrous structure, said layer in sheet form being selected from the group consisting of woven fiber, knitted fiber, braided fiber, and previously entangled fiber; and,
accreting said layer in sheet form to said fibrous structure, thereby increasing said thickness, by repeatedly driving a multitude of felting needles through said layer in sheet form into said fibrous structure without penetrating all the way through said fibrous structure.

21. A needle-felting process, comprising the steps of:
disposing loose fiber over a needling support;
forming a coherent fibrous structure having a thickness by repeatedly driving a multitude of felting needles through said loose fiber into said needling support;
disposing additional loose fiber over said fibrous structure;
accreting said additional loose fiber to said fibrous structure by repeatedly driving a multitude of felting needles through said additional loose fiber into said fibrous structure; and,
progressively increasing said thickness until it reaches a desired thickness by repeating the previous two steps a multitude of times, wherein said multitude of felting needles penetrate said needling support the first time said previous two steps are performed, and do not penetrate said needling support the last time the previous two steps are performed.

22. The process of claim 21, wherein said step of disposing loose fiber includes the step of disposing cross-lapped loose fiber over said fibrous structure.

23. The process of claim 21, wherein said step of disposing loose fiber includes the step of disposing disordered loose fiber over said fibrous structure.

24. The process of claim 21, further comprising the step of fluffing and agitating at least a portion of said loose fiber.

25. The process of claim 21, wherein all of said loose fiber is disordered.

26. The process of claim 21, wherein all of said loose fiber is cross-lapped fiber alternated with disordered fiber.

27. The process of claim 21, further comprising the steps of:
disposing at least one layer in sheet form over said fibrous structure, said layer in sheet form being selected from the group consisting of woven fiber, knitted fiber, braided fiber, and previously entangled fiber; and,
accreting said layer in sheet form to said fibrous structure, thereby increasing said thickness, by repeatedly driving a multitude of felting needles through said layer in sheet form into said fibrous structure without penetrating all the way through said fibrous structure.

28. A needle-felting process, comprising the steps of:
disposing loose fiber over a coherent fibrous structure while rotating said fibrous structure about an axis of rotation, said fibrous structure having a thickness;
accreting said loose fiber to said fibrous structure, thereby increasing said thickness, by repeatedly driving a multitude of felting needles through said loose fiber into said fibrous structure without penetrating all the way through said fibrous structure; and,
repeating the previous two steps a multitude of times until said thickness reaches a desired thickness.

29. The process of claim 28, wherein said step of disposing loose fiber includes the step of disposing cross-lapped loose fiber over said fibrous structure.

30. The process of claim 28, wherein said step of disposing a mass of loose fiber includes the step of disposing disordered loose fiber over said fibrous structure.

31. The process of claim 28, further comprising the step of fluffing and agitating at least a portion of said loose fiber.

32. The process of claim 28, wherein all of said loose fiber is disordered.

33. The process of claim 28, wherein all of said loose fiber is cross-lapped fiber disposed over disordered fiber.

34. The process of claim 28, further comprising the steps of:
disposing at least one layer in sheet form over said fibrous structure, said layer in sheet form being selected from the group consisting of woven fiber, knitted fiber, braided fiber, and previously entangled fiber; and,
accreting said layer in sheet form to said fibrous structure, thereby increasing said thickness, by repeatedly driving a multitude of felting needles through said layer in sheet form into said fibrous structure without penetrating all the way through said fibrous structure.

35. The process of claim 28, wherein said loose fiber comprises continuous filaments.

36. The process of claim 28, wherein said loose fiber comprises staple fiber.

37. The process of claim 28, wherein said fibrous structure develops an area of reduced thickness relative to another area, and further comprising the step of accreting extra fiber to said area of reduced thickness.

38. A needle-felting process, comprising the steps of:
disposing loose fiber over a needling support while rotating said needling support around an axis of rotation;
forming a coherent fibrous structure having a thickness by repeatedly driving a multitude of felting needles through said loose fiber into said needling support;
disposing additional loose fiber over said fibrous structure;
accreting said additional loose fiber to said fibrous structure by repeatedly driving a multitude of felting needles through said loose fiber into said fibrous structure; and,
progressively increasing said thickness until it reaches a desired thickness by repeating the previous two steps a multitude of times, wherein said multitude of felting needles penetrate said needling support the first time said previous two steps are performed, and do not penetrate said needling support the last time the previous two steps are performed.

39. The process of claim 38, wherein said step of disposing additional loose fiber over said fibrous structure comprises the steps of heaping said loose fiber onto said fibrous structure, lifting and dropping said loose fiber heaped onto said fibrous structure, and spreading said loose fiber.

40. The process of claim 38, wherein said fibrous structure develops an area of reduced thickness relative to another area, and further comprising the step of accreting extra fiber to said area of reduced thickness.

41. A needle-felting process, comprising the steps of:

disposing loose fiber over a needling support having a flat face while rotating said needling support around an axis of rotation perpendicular to said flat face, said loose fiber being disposed over said flat face;

forming a coherent annular fibrous structure having a thickness by repeatedly driving a multitude of felting needles through said loose fiber into said needling support parallel to said axis of rotation;

disposing additional loose fiber over said annular fibrous structure;

accreting said loose fiber to said annular fibrous structure by repeatedly driving a multitude of felting needles through said loose fiber into said annular fibrous structure parallel to said axis of rotation, wherein rotating said needling support causes said loose fiber to pass beneath said multitude of felting needles in a feed direction; and, progressively increasing said thickness until said annular fibrous structure reaches a desired thickness by repeating the previous two steps a multitude of times, wherein said multitude of felting needles penetrate said needling support the first time said previous two steps are performed, and do not penetrate said needling support the last time the previous two steps are performed.

42. The process of claim 41, further comprising the steps of disordering at least a portion of said loose fiber and cross-lapping another portion of said loose fiber onto disordered loose fiber transverse to said feed direction before said step of accreting said loose fiber to said annular fibrous structure.

43. The process of claim 41, wherein said annulus has an inside peripheral surface, and further comprising the step of urging said loose fiber toward said inside peripheral surface before passing beneath said needling head.

44. The process of claim 41, wherein said fibrous structure develops an area of reduced thickness relative to another area, and further comprising the step of accreting extra fiber to said area of reduced thickness.

45. The process of claim 41, wherein said annular fibrous structure has an inside peripheral surface and said annular fibrous structure develops an annular area of reduced thickness proximate said inside peripheral surface, and further comprising the step of accreting extra fiber to said area of reduced thickness.

46. The process of claim 41, wherein said annular fibrous structure has an inside peripheral surface and said annular fibrous structure develops an annular area of reduced thickness proximate said inside peripheral surface, and further comprising a final step of accreting extra fiber to said area of reduced thickness.

47. The process of claim 41, wherein said felting needles initially penetrate said needling support with an initial penetration depth, said initial penetration depth being in the range of 7 (seven) to 14 (fourteen) millimeters, inclusive; and, a felting needles penetrate said fibrous structure with a needling density of in the range of 100 to 400 penetrations per square centimeter, inclusive.

48. The process of claim 41, wherein said felting needles initially penetrate said needling support with an initial penetration depth, said initial penetration depth being in the range of 9 (nine) to 10 (ten) millimeters, inclusive; and, a felting needles penetrate said fibrous structure with a needling density of in the range of 150 to 250 penetrations per square centimeter, inclusive.

49. A method of making a fiber reinforced composite material, comprising the steps of:

feeding loose fiber into a needle-felting machine while repeatedly driving a multitude of felting needles into said loose fiber thereby binding said loose fiber into a coherent fibrous structure having a thickness that increases as loose fiber is accreted to said fibrous structure wherein said multitude of felting needles initially penetrate all the way through said fibrous structure and eventually do not penetrate all the way through said fibrous structure as said thickness increases; and depositing a matrix within said fibrous structure.

50. The method of claim 49, wherein said matrix is deposited at least in part by a CVI/CVD process.

* * * * *